United States Patent
Huang et al.

(10) Patent No.: US 9,654,255 B2
(45) Date of Patent: May 16, 2017

(54) DATA TRANSMISSION METHOD AND DEVICE

(75) Inventors: Chunxing Huang, Shenzhen (CN); Wan Lam, Shenzhen (CN); Pongbo Guo, Chengdu (CN); Zhongrong Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 611 days.

(21) Appl. No.: 13/613,112

(22) Filed: Sep. 13, 2012

(65) Prior Publication Data

US 2013/0064312 A1    Mar. 14, 2013

(30) Foreign Application Priority Data

Sep. 13, 2011    (CN) .......................... 2011 1 0269216

(51) Int. Cl.
  *H04L 1/00*  (2006.01)
  *H04L 1/18*  (2006.01)
  *H04L 1/20*  (2006.01)
(52) U.S. Cl.
  CPC ............ *H04L 1/009* (2013.01); *H04L 1/0083* (2013.01); *H04L 1/1809* (2013.01); *H04L 1/205* (2013.01)
(58) Field of Classification Search
  USPC ............... 375/259, 260, 267, 299, 349, 356
  See application file for complete search history.

(56) References Cited

U.S. PATENT DOCUMENTS

2007/0075735 A1*  4/2007  Arora .............................. 326/41
2008/0176591 A1*  7/2008  Fujimoto ...................... 455/500
2011/0286340 A1*  11/2011  Janecek et al. ............... 370/252

FOREIGN PATENT DOCUMENTS

CN          1617525 A        5/2005

OTHER PUBLICATIONS

Partial translation of Office Action dated May 6, 2013 in connection with Chinese Patent Application No. 201110269216.4.

* cited by examiner

*Primary Examiner* — Kabir A Timory

(57) ABSTRACT

The present invention provides a data transmission method including: sending, by a transmitter, a source data frame to a receiver, and saving the source data frame; sending, by the transmitter, other data frames to the receiver, and saving the other data frames; receiving, by the transmitter, a data retransmission notification which is related to the source data frame and sent by the receiver; and retrieving, by the transmitter, the source data frame and other data frames from a storage space, where the other data frames are sent by the transmitter to the receiver in a time period from sending the source data frame by the transmitter to receiving the data retransmission notification by the transmitter, and retransmitting the source data frame and the other data frames to the receiver.

20 Claims, 5 Drawing Sheets

DATA TRANSMISSION METHOD AND DEVICE

CROSS-REFERENCE TO RELATED APPLICATION

This application claims priority to Chinese Patent Application No. 201110269216.4, filed on Sep. 13, 2011, which is hereby incorporated by reference in its entirety.

FIELD OF THE INVENTION

The present invention relates to the field of communication, and in particular, to a data transmission method and device.

BACKGROUND OF THE INVENTION

According to traditional experience, it is considered that, when the keyhole of a latch is high enough, a high-speed backplane interconnection link may be generally considered as a random error channel. An error is mainly caused by random events such as random noise and crosstalk that are inside a chip, and a link error may be approximately considered as a random error, and an error of each bit is irrelevant to each other. However, with the introduction of some sophisticated processing technologies, the approximate assumption is no longer tenable. Relevance exists among link errors. Therefore, if such processing technologies are introduced into a high-speed serial link, the link is degraded into a mixed error channel.

According to an existing bit error rate requirement of 10 Gbps rate interconnection, traditional link optimization and signal processing technologies no longer meet requirements, and an error correction coding technology needs to be used for implementation. Currently, a forward error correction coding (Forward Error Correct, abbreviated as FEC) technology is commonly used in the industry. FEC is a type of error correction coding. Reliability of transmission is improved by adding certain redundant bits, a single error or a burst error caused by a transmission channel is corrected, and system error performance is improved effectively. Because there is a direct relationship between an error correction capability of the FEC and the width of the redundant bits, an error correction effect is not satisfying when the redundant bits are few, and too many redundant bits reduce link transmission efficiency. Therefore, an existing FEC solution can hardly achieve balance between the error correction capability and the transmission efficiency.

SUMMARY OF THE INVENTION

A technical problem to be solved by embodiments of the present invention is to achieve balance between transmission efficiency and an error correction capability.

According to an embodiment of the present invention, a data transmission method is provided, where the method includes:

sending, by a transmitter, a source data frame to a receiver, and saving the source data frame;

sending, by the transmitter, other data frames to the receiver, and saving the other data frames;

receiving, by the transmitter, a data retransmission notification which is related to the source data frame and sent by the receiver; and retrieving, by the transmitter, the source data frame and other data frames from a storage space, where the other data frames are sent by the transmitter to the receiver in a time period from sending the source data frame by the transmitter to receiving the data retransmission notification by the transmitter, and retransmitting the source data frame and the other data frames to the receiver, where the other data frames are sent by the transmitter to the receiver in the time period from sending the source data frame by the transmitter to receiving the data retransmission notification by the transmitter.

According to an embodiment of the present invention, a data transmission method is provided, where the method includes:

receiving, by a receiver, a source data frame sent by a transmitter, and performing synchronization and error detection;

sending a data retransmission notification specific to the source data frame to the transmitter if the receiver discovers an error of the source data frame; and receiving, by the receiver, the source data frame retransmitted by the transmitter and other data frames sent by the transmitter to the receiver in a time period from sending the source data frame by the transmitter to receiving the data retransmission notification by the transmitter.

According to an embodiment of the present invention, a data transmission device is provided, where the device includes:

a sending module, configured to send a source data frame and other data frames;

a storage module, configured to save the source data frame and the other data frames;

a receiving module, configured to receive a data retransmission notification which is related to the source data frame and sent by a receiver; and a retransmission module, configured to retrieve the source data frame and other data frames from the storage module, where the other data frames are sent by the sending module to the receiver in a time period from sending the source data frame by the sending module to receiving the data retransmission notification by the receiving module, so that the sending module retransmits the source data frame and the other data frames to the receiver, where the other data frames are sent by the sending module to the receiver in the time period from sending the source data frame by the sending module to receiving the data retransmission notification by the receiving module.

According to an embodiment of the present invention, a data transmission device is provided, where the device includes:

a receiving module, configured to receive a source data frame sent by a transmitter;

an error detection module, configured to perform synchronization and error detection on the source data frame received by the receiving module; and a retransmission notification module, configured to send a data retransmission notification specific to the source data frame to the transmitter when the error detection module discovers an error of the source data frame, so that the receiving module receives the source data frame retransmitted by the transmitter and other data frames sent by the transmitter to the receiving module in a time period from sending the source data frame by the transmitter to receiving the data retransmission notification by the transmitter.

According to the embodiments of the present invention, it is ensured that an error in the order of a retransmitted data frame and subsequent data frames in the automatic data retransmission process does not occur. Moreover, the implementation solution of the embodiments of the present invention is easy, and few resources are consumed.

BRIEF DESCRIPTION OF THE DRAWINGS

To describe the technical solutions in the embodiments of the present invention more clearly, accompanying drawings needed to be used in description of the embodiments or the prior art are briefly introduced below. Apparently, the accompanying drawings in the following description are merely some embodiments of the present invention, and persons of ordinary skill in the art may further obtain other drawings according to these accompanying drawings without making creative efforts.

DETAILED DESCRIPTION OF THE EMBODIMENTS

The technical solutions in the embodiments of the present invention are clearly and completely described below in conjunction with the accompanying drawings in the embodiments of the present invention. Evidently, the embodiments to be described are merely part of rather than all of the embodiments of the present invention. All other embodiments derived by persons of ordinary skill in the art based on the embodiments of the present invention without making creative efforts shall fall within the protection scope of the present invention.

The technical solutions of the present invention may be applied to various communication systems, such as GSM, code division multiple access (CDMA, Code Division Multiple Access) system, wideband code division multiple access (WCDMA, Wideband Code Division Multiple Access), general packet radio service (GPRS, General Packet Radio Service) system, and long term evolution (LTE, Long Term Evolution).

An embodiment of the present invention provides a data transmission method based on an automatic retransmission request (Automatic Retransmission Request, abbreviated as ARQ) mechanism, so as to better achieve balance between data transmission efficiency and an error correction capability, solve a problem of a deficient error correction capability of FEC (with a bit error rate gain of 2 orders of magnitude), further improve a bit error rate gain of a link (with the bit error rate gain of 7 orders of magnitude), and ensure link system robustness.

Figure 1:
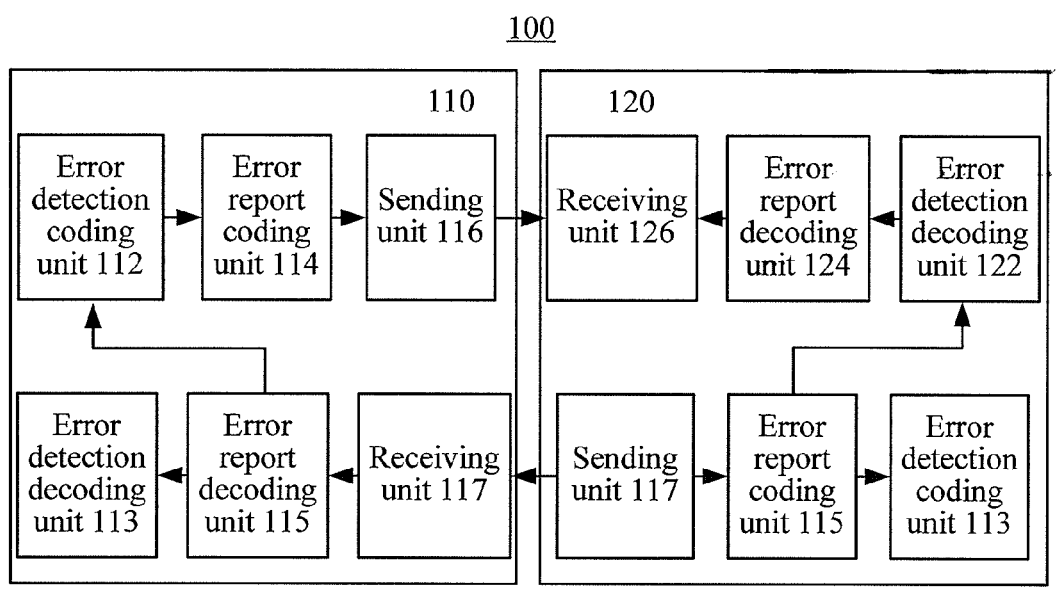
FIG. 1 is a schematic structural diagram of a system for implementing a data transmission method according to an embodiment of the present invention.

FIG. 1 is a schematic structural diagram of a system for implementing a data transmission method according to an embodiment of the present invention. As shown in FIG. 1, a system 100 includes a transmitter 110 and a receiver 120. The transmitter 110 includes an error detection coding unit 112, an error report coding unit 114, and a sending unit 116, and further includes an error detection decoding unit 113, an error report decoding unit 115, and a receiving unit 117. The receiver 120 includes a receiving unit 126, an error report decoding unit 124, and an error detection decoding unit 122, and further includes an error detection coding unit 123, an error report coding unit 125, and a sending unit 127.

A basic conception of the data transmission method in the embodiment of the present invention is as follows. The transmitter 110 performs error detection coding and error report coding on a data frame, and then sends the data frame to the receiver 120; the receiver 120 discovers a transmission error when performing error report decoding and error detection decoding, and then notifies, through a data frame sent by the receiver 120 to the transmitter 110, a retransmission instruction to the transmitter 110 for data retransmission. Error report coding is also performed on the data frame sent by the receiver 120 to the transmitter 110, and the transmitter 110 performs error report decoding after receiving the data frame that includes the retransmission instruction, and instructs the transmitter 110 to resend data after judging that the retransmission instruction is received.

The term "error report coding" in the embodiment of the present invention refers to high-speed link coding capable of transferring information, for example, XB/YB coding. A specific method of error report coding is not limited in the embodiment of the present invention. Persons skilled in the art may select a proper high-speed link coding method according to requirements, so long as a function of transferring information through the coding method can be implemented. For ease of description, the error report coding is described below by taking the XB/YB coding method as an example. The "error report decoding" corresponds to "error report coding".

Figure 2:
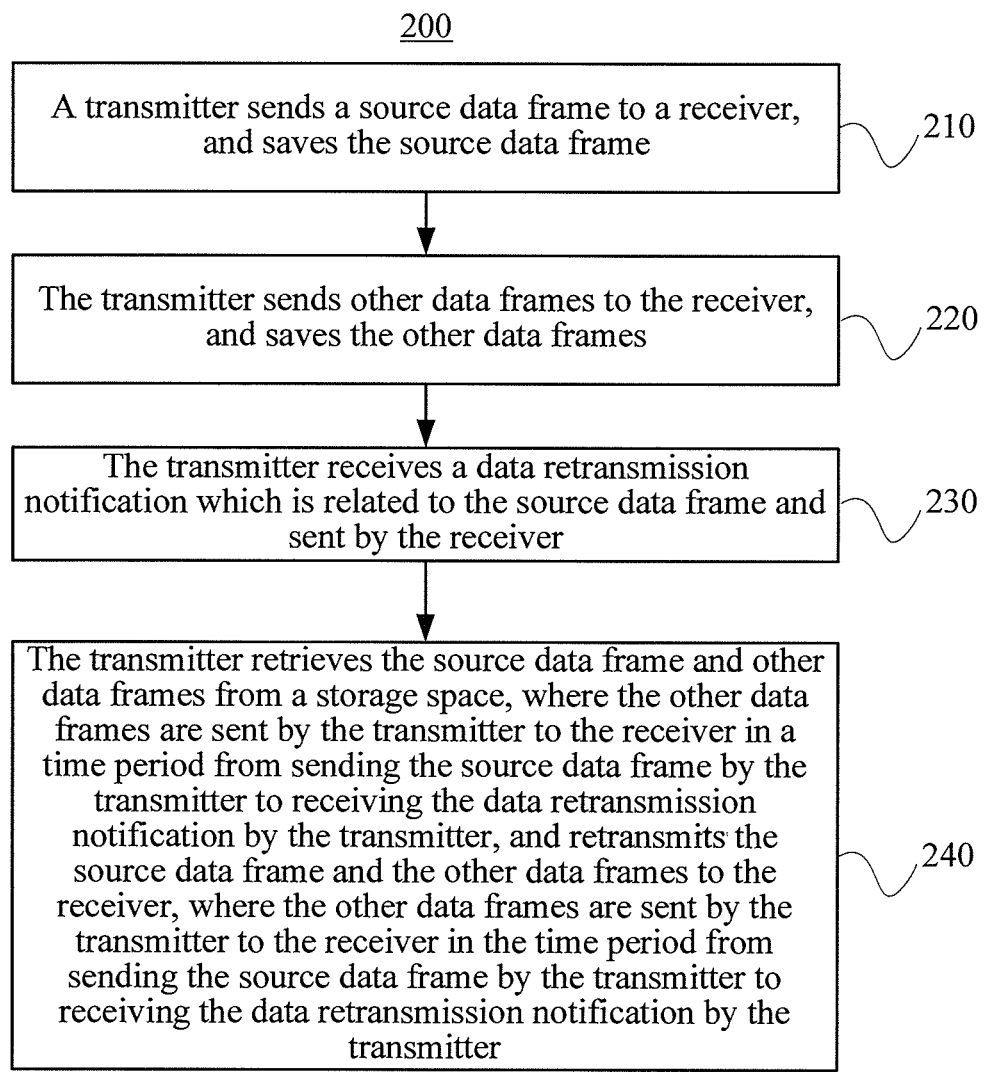
FIG. 2 is a flowchart of a data transmission method according to an embodiment of the present invention.

FIG. 2 is a flowchart of a data transmission method according to an embodiment of the present invention. As shown in FIG. 2, a data transmission method 200 includes the following steps.

210: A transmitter 110 sends a source data frame to a receiver 120, and saves the source data frame.

220: The transmitter 110 sends other data frames to the receiver 120, and saves the other data frames.

230: The transmitter 110 receives a data retransmission notification which is related to the source data frame and sent by the receiver 120.

240: The transmitter 110 retrieves the source data frame and other data frames from a storage space, where the other data frames are sent by the transmitter 110 to the receiver 120 in a time period from sending the source data frame by the transmitter 110 to receiving the data retransmission notification by the transmitter 110, and retransmits the source data frame and the other data frames to the receiver 120, where the other data frames are sent by the transmitter 110 to the receiver 120 in the time period from sending the source data frame by the transmitter 110 to receiving the data retransmission notification by the transmitter 110.

The data transmission method in the embodiment of the present invention is described in detail below with reference to FIG. 1 and FIG. 2. In the method in the embodiment of the present invention, the error detection coding unit 112 of the transmitter 110 performs error detection coding, for example, 32-bit cyclic redundancy check (Cyclic Redundancy Check 32, abbreviated as CRC32) coding or CRC16 coding, on a data frame to be sent, and then a data frame with error detection codes of K*L bits is formed, where K is the parallel data bit width processed by the system 100, and L is the length of the data frame. The data frame with error detection codes includes M (such as 32 or 16) error detection check bits, so valid data is of K*L-M bits. In practical application, values of K, L, and M may be selected according to situations. Greater values of K and L indicate that a longer link transmission delay can be supported, and also indicate that more resources are consumed; a greater value of M indicates a higher coding overhead, and also indicates increasing of an error detection capability.

After performing error detection coding on the data frame, the error detection coding unit 112 sends the data frame with error detection codes to an XB/YB coding unit 114. The XB/YB coding unit 114 may use 64 B/66 B coding, 64 B/67 B coding, or 8 B/10 B coding to code the data frame with error detection codes to form a data frame with XB/YB codes, such as a data frame with 64 B/66 B codes.

According to the embodiment of the present invention, the error detection coding unit 112 may store the data frame to be sent in a storage module, perform error detection coding, and then send the data frame after error detection coding to the XB/YB coding unit 114. Alternatively, the error detection coding unit 112 may perform error detection coding on the data frame, and then store the data frame after error detection coding in the storage module. These two storage manners both can be used in a data retransmission process to be described in detail below.

According to the embodiment of the present invention, in order to be compatible with the XB/YB coding, K*L that may be selected for the size of the data frame is an integer multiple of X. In this case, the greatest common divisor of K*L and X may be defined as H, and the error detection coding module 112 ensures that a valid data frame header of one data frame with error detection codes in every X/H data frames is also a frame header of the data frame with XB/YB codes at the same time. It should be noted that, when M is not an integer multiple of X, the insertion of a check code affects a synchronization law between an original valid data bit and the data frame with XB/YB codes. In this case, a specific value of an M-bit check code may be defined to represent an offset state between the original valid data bit and the data frame with XB/YB codes, so that the receiver 120 recovers a true valid data bit according to the offset state when receiving the data frame and performing error detection decoding, which is described in detail below.

The data frame coded by the XB/YB coding unit 114 is sent to the sending unit 116, and the sending unit 116 sends the data frame to the receiving unit 126 of the receiver 120. After receiving the data frame sent by the transmitter 110, the receiving unit 126 sends the data frame to a YB/XB decoding unit 124 for YB/XB decoding. A decoding method adopted by the YB/XB decoding unit 124 corresponds to the coding method adopted by the XB/YB coding unit 114 of the transmitter 110. The data frame decoded by the YB/XB decoding unit 124 is sent to the error detection decoding unit 122 for error detection decoding. A decoding method adopted by the error detection decoding unit 122 corresponds to the coding method adopted by the error detection coding unit 112 of the transmitter 110. When discovering an error of an error detection result, the error detection decoding unit 122 notifies the transmitter 110 of performing data retransmission.

The process of notifying the transmitter 110 of performing data retransmission is described in detail below with reference to FIG. 1 and FIG. 2. According to the embodiment of the present invention, a notification for performing data retransmission is transmitted through a data frame with XB/YB codes sent by the receiver 120 to the transmitter 110. According to different XB/YB coding or decoding methods that are adopted, the data retransmission notification may be implemented by using different information carried in the data frame with XB/YB codes. For example, if 64 B/66 B coding or decoding is adopted, synchronization headers may be defined as follows: 01 is a common synchronization header, 10 is a data delimitation synchronization header, and 11 and 00 are invalid synchronization headers. When the data retransmission notification needs to be sent to the transmitter 110, the receiver 120 changes three 01 synchronization headers of the data frame with 64 B/66 B codes sent to the transmitter 110 to 11, and the transmitter 110 considers that the data retransmission notification is received when receiving the three 11 synchronization headers. According to the embodiment of the present invention, the three 11 synchronization headers may be continuous, or spaced apart by the data delimitation synchronization header 10. For another example, when 8 B/10 B coding or decoding is adopted, a special COM code may be defined to represent the data retransmission notification. According to the embodiment of the present invention, for other XB/YB coding manners, a manner for expressing data retransmission may be formulated according to specific coding characteristics.

After the receiving unit 117 of the transmitter 110 receives the data frame that includes the data retransmission notification and is sent by the sending unit 127 of the receiver 120, a YB/XB decoding unit 115 performs decoding. If information obtained after the YB/XB decoding unit 115 performs decoding includes the data retransmission notification, the error detection coding unit 112 retrieves the stored data frame from the storage module, and resends the data frame to the receiver 120 according to the foregoing data transmission method.

In practical application, data frames 2 to N may have been sent from the transmitter when the receiver 120 discovers an error of a data frame 1. In order to keep correct order of the data frames, the receiver 120 not only discards the data frame 1, but also discards the subsequent data frames 2 to N. Therefore, according to the embodiment of the present invention, the transmitter 110 needs to save N frames of data according to a sending sequence, so that the transmitter 110 retransmits data frames 1 to N when the receiver 120 discovers the error of the data frame 1. In practical application, a link delay from the transmitter 110 to the receiver 120 is fixed, and a link delay from discovering the error and sending a retransmission notification to the transmitter 110 by the receiver 120 to receiving the retransmission notification by the transmitter 110 is also fixed, therefore, the value of N, for example, N≥2, N=2, 3, or 4, may be selected according to the link delays. A condition for selecting N is that the data frame N has not been completely sent when the transmitter 110 receives the notification indicating the error of transmission of the data frame 1 and the need of performing retransmission. In this way, the data frame 1 to the data frame N can be retransmitted after the data frame N is completely sent. After the data frames 1 to N are retransmitted successfully, the transmitter 110 discards the data frame 1, and saves a data frame N+1 additionally. In a word, the transmitter 110 always saves N frames of data. An example that N=2 is taken for description. The transmitter 110 saves a first frame of data and a second frame of data. When discovering an error of transmission of the first frame of data, the receiver 120 sends a retransmission notification to the transmitter 110. When the transmitter 110 receives the retransmission notification, the second frame of data has been sent out from the transmitter 110. In this case, the receiver 120 discards the received second frame of data, and waits for receiving a first frame of data and a second frame of data that are sent by the transmitter 110. After the retransmitted first frame of data is received, error detection is performed again, and after it is confirmed that there is no error, error detection is performed again on the received second frame of data. In this case, if no new retransmission notification is received after completion of retransmitting the second frame of data, the transmitter 110 discards the saved first frame of data, and saves a third frame of data additionally according to the sending sequence.

According to the data transmission method in the embodiment of the present invention, after receiving the data frame decoded by the YB/XB decoding unit 124, the error detection decoding unit 122 of the receiver 120 needs to perform synchronization and error detection on the data frame. The process of the synchronization and error detection is specifically implemented as follows:

In an out-of-sync state, find an X-bit data frame first, assume that the X-bit data frame is a start point of the source data frame, and then perform error detection on a subsequent frame of data; if I consecutive times of check are correct, it is determined that data frames are synchronized successfully; otherwise, shift H bits sequentially, and assume that it is a start point of the source data frame again, and perform error detection until the synchronization is successful; in a synchronized state, if results of J consecutive times of error detection show errors, it is determined that the data frames are out of sync. I and J here may be selected according to specific situations.

In the synchronized state, if it is found that an error detection result shows errors, the XB/YB coding unit 114 of the transmitter 110 is notified of retransmitting data. When the transmitter 110 receives a retransmission request from the receiver 120, the error detection coding unit 112 requests a previous-level processing unit to stop inputting data, retrieves the data frame in the storage module, and sends the data frame to the receiver 120.

The method in the embodiment of the present invention is described below with reference to a specific example.

It is selected that K=32, L=128 (in this case, a link delay of a 30 m fiber may be supported), and M=32, so H=64. Moreover, it is selected that the number of retransmitted frames N=2, a synchronization count I=8, and an out-of-sync count J=4.

CRC32 coding or decoding is adopted for the error detection coding or decoding, 64 B/66 B coding or decoding is selected for XB/YB, and the synchronization headers are defined as follows: 01 is a common synchronization header, 10 is a special synchronization header for cell delimitation, and 11 and 00 are invalid synchronization headers.

When the receiver 120 needs to send a data retransmission notification to the transmitter 110, the receiver 120 changes three 01 synchronization headers of the data frame, on which 64 B/66 B coding is performed by a 64 B/66 B coding unit 125, to 11, and the 64 B/66 B decoding unit 115 of the transmitter 110 considers that the data retransmission notification is received when discovering the three 11 synchronization headers.

In the original valid data, delimitation information of the data frame is synchronized with 64 B/66 B coding logic, after a 32-bit check code is inserted, delimitation information in a next CRC32 data frame offsets from the 64 B/66 B coding logic, and after a 32-bit check code is inserted again, a next frame of data recovers the synchronized state, and so on. Therefore, an offset state of synchronization between a data frame with CRC32 codes and the data frame with 64 B/66 B codes comes in two types: synchronized and out-of-sync. Data frame delimitation information in a synchronized frame (a CRC32 data frame whose CRC32 data frame delimitation information is logically synchronized with the data frame with 64 B/66 B codes) is synchronized with a header of the data frame with 64 B/66 B codes, and therefore, the 10 synchronization header is adopted; data frame delimitation information in an out-of-sync frame (a CRC32 data frame whose CRC32 data frame delimitation information is logically out-of-sync with the data frame with 64 B/66 B codes) lags behind the header of the data frame with 64 B/66 B codes by 32 bits. If a CRC calculation result of the error detection decoding unit 122 of the receiver 120 is C, the check code of the synchronized frame is C, and the check code of the out-of-sync frame is ~C. The receiver 120 prejudges whether a next frame is a synchronized frame or an out-of-sync frame according to whether the state of the check code is C or ~C, and recovers true delimitation information accordingly.

According to the embodiment of the present invention, in the foregoing example, the synchronization headers which are of the data frame with 64 B/66 B codes and represent the data retransmission notification may be defined by other means. For example, another invalid synchronization header is adopted to replace 11; or multiple types of synchronization headers appear in a certain law to express the data retransmission notification, for example, a combination of 00, 11, and 00 appears; or the same invalid synchronization header appears for multiple times, such as 2, 4, or more times, for representation.

According to the embodiment of the present invention, other coding manners such as CRC16 coding or BIP coding may be adopted for the error detection coding. During coding, information about whether the data frame with error detection codes is logically synchronized with the data frame with 64 B/66 B codes may be transferred according to requirements. For example, when M=64, the insertion of the check bit does not affect the synchronization state, and the synchronization state information does not need to be transferred. When M=16, a logical synchronization state between the CRC16 data frame and the data frame with 64 B/66 B codes comes in 4 types, namely, 16 bits offset, 32 bits offset, 48 bits offset, and synchronized. Synchronization occurs every 4 frames of data. Therefore, a specific value of a 16-bit check code may be set to represent the 4 types of synchronization state information, so as to recover true valid data.

According to the embodiment of the present invention, an automatic data retransmission mechanism is implemented by using error detection coding and XB/YB coding, and the balance between the data transmission efficiency and the error correction capability is achieved.

According to the embodiment of the present invention, it is ensured that an error in the order of a retransmitted data frame and subsequent data frames in the automatic data retransmission process does not occur. Moreover, the implementation solution of the embodiment of the present invention is easy, and few resources are consumed.

According to an embodiment of the present invention, a device for implementing the data transmission method in the embodiment of the present invention is further provided. It should be noted that, features of the method embodiment of the present invention are equally applicable to the device embodiment of the present invention.

Figure 3:
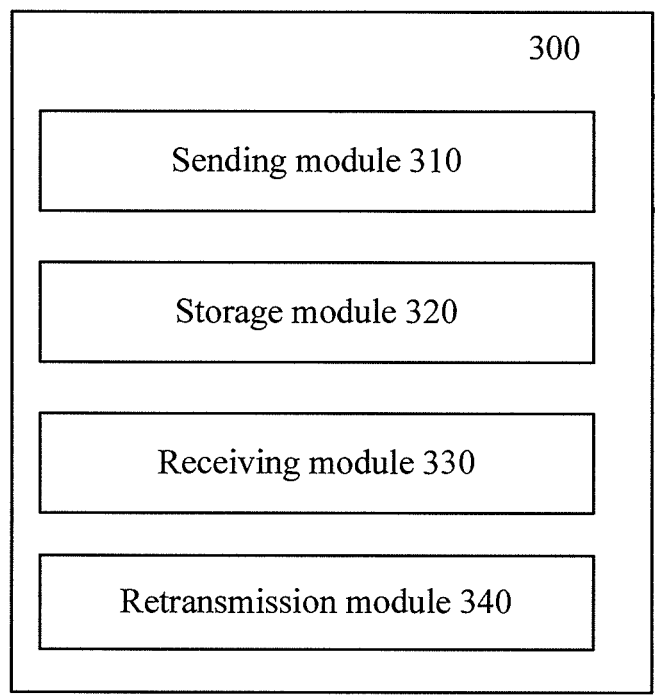
FIG. 3 is a schematic structural diagram of a device for implementing a data transmission method according to an embodiment of the present invention.

FIG. 3 is a schematic structural diagram of a device 300 for implementing a data transmission method according to an embodiment of the present invention. The device 300 may be used as a transmitter device. As shown in FIG. 3, the device 300 includes:

a sending module 310, configured to send a source data frame and other data frames;

a storage module 320, configured to save the source data frame and the other data frames;

a receiving module 330, configured to receive a data retransmission notification which is related to the source data frame and sent by a receiver; and a retransmission module 340, configured to retrieve the source data frame and other data frames from the storage module 320, where the other data frames are sent by the sending module 310 to the receiver in a time period from sending the source data frame by the sending module 310 to receiving the data retransmission notification by the receiving module 330, so that the sending module 310 retransmits the source data frame and the other data frames to the receiver, where the other data frames are sent by the sending module 310 to the receiver in the time period from sending the source data frame by the sending module 310 to receiving the data retransmission notification by the receiving module 330.

Figure 4:
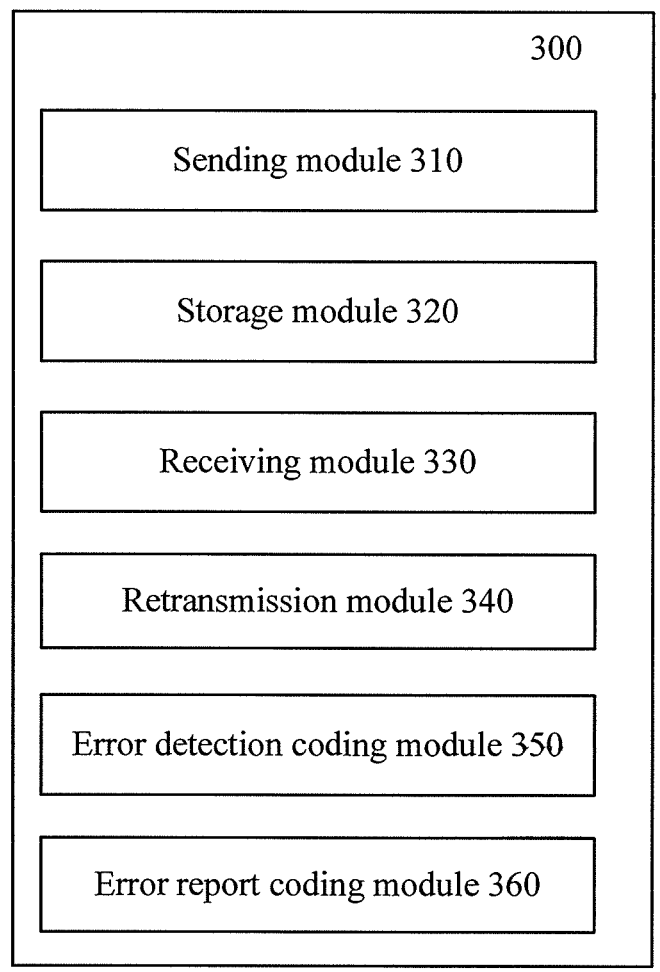
FIG. 4 is a further schematic structural diagram of a device for implementing a data transmission method according to an embodiment of the present invention.

As shown in FIG. 4, according to the embodiment of the present invention, the device 300 further includes:

an error detection coding module 350, configured to perform error detection coding on the source data frame to form a data frame with error detection codes; and an error report coding module 360, configured to perform error report coding on the source data frame to form a data frame with error report codes, so that the receiver performs synchronization and error detection on the source data frame according to the data frame with error detection codes and the data frame with error report codes.

According to the embodiment of the present invention, the error report coding module 360 performs XB/YB coding on the source data frame.

According to the embodiment of the present invention, specific synchronization headers of the data frame with XB/YB codes are used to represent the data retransmission notification received by the receiving module 330, at least two specific synchronization headers exist, and the specific synchronization headers appear continuously or in a predetermined order.

According to the embodiment of the present invention, the error detection coding module 350 performs CRC32 coding, CRC16 coding, or BIP coding on the source data frame.

Figure 5:
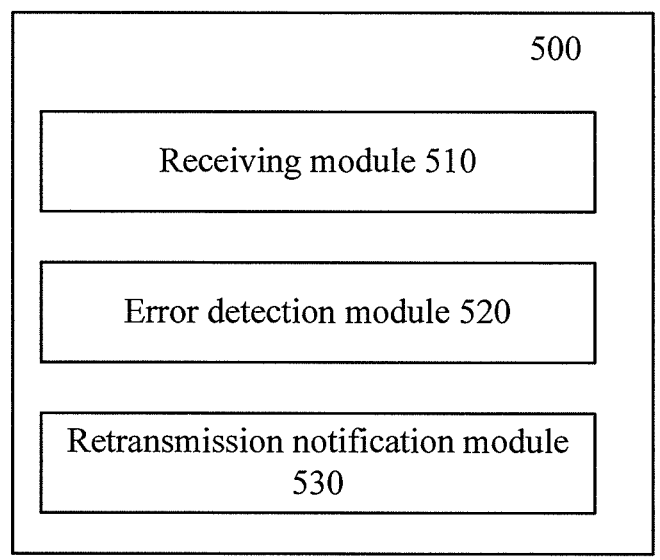
FIG. 5 is a schematic structural diagram of another device for implementing a data transmission method according to an embodiment of the present invention.

FIG. 5 is a schematic structural diagram of a device 500 for implementing a data transmission method according to an embodiment of the present invention. The device 500 may be used as a receiver device. As shown in FIG. 5, the device 500 includes:

a receiving module 510, configured to receive a source data frame sent by a transmitter;

an error detection module 520, configured to perform synchronization and error detection on the source data frame received by the receiving module; and a retransmission notification module 530, configured to send a data retransmission notification specific to the source data frame to the transmitter when the error detection module 520 discovers an error of the source data frame, so that the receiving module 510 receives the source data frame retransmitted by the transmitter and other data frames sent by the transmitter to the receiving module 510 in a time period from sending the source data frame by the transmitter to receiving the data retransmission notification by the transmitter.

According to the embodiment of the present invention, the source data frame received by the receiving module undergoes error detection coding and error report coding.

According to the embodiment of the present invention, the error report coding is performed, by using XB/YB coding, on the source data frame received by the receiving module.

According to the embodiment of the present invention, specific synchronization headers of the data frame with XB/YB codes are used to represent the data retransmission notification sent by the retransmission notification module 530 to the transmitter, at least two specific synchronization headers exist, and the specific synchronization headers appear continuously or in a predetermined order.

According to the embodiment of the present invention, the error detection coding of the source data frame is CRC32 coding, CRC16 coding, or BIP coding.

Persons of ordinary skill in the art may be aware that the various exemplary units and algorithm steps described in conjunction with the embodiments disclosed herein can be implemented by electronic hardware or a combination of computer software and electronic hardware. Whether these functions are implemented in the form of hardware or software depends upon particular application of the technical solutions and constraint conditions of design. Persons skilled in the art may implement the described functions in different ways for each particular application, but such implementation should not be interpreted as causing a departure from the scope of the present information.

Persons skilled in the art may clearly understand that, for ease and brevity of description, for specific working procedures of the above-described systems, apparatuses, and units, reference may be made to corresponding procedures in the foregoing method embodiments, and details are not repeatedly described here.

It should be understood that, in the several embodiments provided in the present application, the disclosed systems, apparatuses and methods may be implemented in other manners. For example, the above-described apparatus embodiments are merely exemplary. For example, dividing of the units is merely a type of logical function dividing, and there may be other dividing manners during actual implementation. For example, multiple units or components may be combined or integrated into another system, or some features may be ignored, or may not be executed. Besides, the shown or discussed mutual coupling, direct coupling or communication connection may be implemented through some interfaces, and indirect coupling or communication connection between apparatuses or units may be electronic, mechanical, or in other forms.

The units described as separate parts may be or may not be separated physically; and the parts shown as units may be or may not be physical units, namely, may be located in one place, or may also be distributed on multiple network units. Part of or all of the units described above may be selected according to actual requirements to fulfill the objectives of the solutions of the embodiments.

Besides, all functional units in the embodiments of the present invention may be integrated into one processing unit, the units may also be separated physically, and two or more than two of the preceding units may also be integrated into one unit.

When being implemented in the form of a software function unit and sold or used as a stand-alone product, the functions may be stored in a computer-readable storage medium. Based on such understanding, the essence of the technical solutions of the present invention, or part that makes contributions to the prior art, or part of the technical solution may be embodied in the form of a software product. The computer software product is stored in a storage medium, and incorporates several instructions for instructing a computer device (for example, personal computer, server, or network device) to execute all or part of the steps of the method in any embodiment of the present invention. The foregoing storage medium includes various types of media capable of storing program codes, such as a USB flash disk, a mobile hard disk, a read-only memory (ROM, Read-Only Memory), a random access memory (RAM, Random Access Memory), a magnetic disk, or a compact disk.

The foregoing descriptions are merely specific implementation manners of the present invention, but not intended to limit the protection scope of the present invention. Any variations or replacement that may be easily derived by persons skilled in the art within the technical scope disclosed in the present invention shall fall within the protection scope of the present invention. Therefore, the protection scope of the present invention is subject to the protection scope of the appended claims.

What is claimed is:

1. A data transmission method, comprising:
performing, by a transmitter, error detection coding and error report coding of a data frame to form a source data frame with error detection codes and error report codes;
sending, by the transmitter, the source data frame to a receiver, and saving the source data frame;
sending, by the transmitter, other data frames to the receiver, and saving the other data frames;
receiving, by the transmitter, a data retransmission notification which is related to the source data frame and sent by the receiver;
retrieving, by the transmitter, the source data frame and other data frames from a storage space, wherein the other data frames are sent by the transmitter to the receiver in a time period from sending the source data frame by the transmitter to receiving the data retransmission notification by the transmitter, and retransmitting the source data frame and the other data frames to the receiver.

2. The data transmission method according to claim 1, wherein the error detection codes and error report codes are configured to enable the receiver to perform synchronization and error detection on the source data frame.

3. The data transmission method according to claim 1, wherein the error report coding is XB/YB coding.

4. The data transmission method according to claim 3, wherein specific synchronization headers of the source data frame with XB/YB codes are used to represent the data retransmission notification, at least two specific synchronization headers exist, and the specific synchronization headers appear continuously or in a predetermined order.

5. The data transmission method according to claim 1, wherein the error detection coding is cyclic redundancy check 32 bits (CRC32) coding, cyclic redundancy check 16 bits (CRC16) coding or bit interleaved parity (BIP) coding.

6. A data transmission method, comprising:
receiving, by a receiver, a source data frame sent by a transmitter, wherein the received source data frame includes error detection codes and error report codes;
sending a data retransmission notification specific to the source data frame to the transmitter if the receiver discovers an error of the source data frame; and
receiving, by the receiver, the source data frame retransmitted by the transmitter and other data frames sent by the transmitter to the receiver in a time period from sending the source data frame by the transmitter to receiving the data retransmission notification by the transmitter.

7. The data transmission method according to claim 6, further comprising:
performing, by the receiver, synchronization and error detection.

8. The data transmission method according to claim 6, wherein the error report coding is XB/YB coding.

9. The data transmission method according to claim 8, wherein specific synchronization headers of the source data frame with XB/YB codes are used to represent the data retransmission notification, at least two specific synchronization headers exist, and the specific synchronization headers appear continuously or in a predetermined order.

10. The data transmission method according to claim 6, wherein the error detection coding is cyclic redundancy check 32 bits (CRC32) coding, cyclic redundancy check 16 bits (CRC16) coding or bit interleaved parity (BIP) coding.

11. A device for data transmission, comprising:
an error detection coding module and an error report coding module configured to perform error detection coding and error report coding of a data frame to form a source data frame with error detection codes and error report codes;
a sending module, configured to send the source data frame and other data frames;
a storage module, configured to save the source data frame and the other data frames;
a receiving module, configured to receive a data retransmission notification which is related to the source data frame and sent by a receiver; and
a retransmission module, configured to retrieve the source data frame and other data frames from the storage module, wherein the other data frames are sent by the sending module to the receiver in a time period from sending the source data frame by the sending module to receiving the data retransmission notification by the receiving module, so that the sending module retransmits the source data frame and the other data frames to the receiver.

12. The device according to claim 11, wherein the error detection codes and error report codes are configured to enable the receiver to perform synchronization and error detection on the source data frame.

13. The device according to claim 11, wherein the error report coding module performs XB/YB coding on the source data frame.

14. The device according to claim 13, wherein specific synchronization headers of the source data frame with XB/YB codes are used to represent the data retransmission notification received by the receiving module, at least two specific synchronization headers exist, and the specific synchronization headers appear continuously or in a predetermined order.

15. The device according to claim 11, wherein the error detection coding module performs cyclic redundancy check 32 bits (CRC32) coding, cyclic redundancy check 16 bits (CRC16) coding or bit interleaved parity (BIP) coding on the source data frame.

16. A device for data transmission, comprising:
a receiving module, configured to receive a source data frame sent by a transmitter, wherein the source data frame includes error detection codes and error report codes;
an error detection module and an error report module configured to perform error detection and error reporting of the source data frame with the error detection codes and the error report codes; and a retransmission notification module, configured to send a data retransmission notification specific to the source data frame to the transmitter when the error detection module discovers an error of the source data frame, so that the receiving module receives the source data frame retransmitted by the transmitter and other data frames sent by the transmitter to the receiving module in a time period from sending the source data frame by the transmitter to receiving the data retransmission notification by the transmitter.

17. The device according to claim 16, wherein the error detection module is further configured to perform synchronization.

18. The device according to claim 16, wherein the error report coding is performed, by using XB/YB coding, on the source data frame received by the receiving module.

19. The device according to claim 18, wherein specific synchronization headers of the source data frame with XB/YB codes are used to represent the data retransmission notification sent by the retransmission notification module to the transmitter, at least two specific synchronization headers exist, and the specific synchronization headers appear continuously or in a predetermined order.

20. The device according to claim 16, wherein the error detection coding of the source data frame is cyclic redundancy check 32 bits (CRC32) coding, cyclic redundancy check 16 bits (CRC16) coding or bit interleaved parity (BIP) coding.

* * * * *

UNITED STATES PATENT AND TRADEMARK OFFICE
CERTIFICATE OF CORRECTION

PATENT NO.       : 9,654,255 B2
APPLICATION NO.  : 13/613112
DATED            : May 16, 2017
INVENTOR(S)      : Chunxing Huang et al.

It is certified that error appears in the above-identified patent and that said Letters Patent is hereby corrected as shown below:

On the Title Page

Item (75) please correct the Inventors' names as follows:
Pongbo Guo should be corrected to "Pengbo Guo";
Zhongrong Liu should be corrected to "Zhengrong Liu".

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*